United States Patent Office 3,044,929
Patented July 17, 1962

---

3,044,929
FUMIGANT COMPOSITIONS COMPRISING HEXA-METHYLENE TETRAMINE DINITRATE
Gerhard Bodo, Vienna, Alfred Diskus and Walther Beck, Linz, Austria, assignors to Osterreichische Stickstoffwerke Aktiengesellschaft, Linz, Austria
No Drawing. Filed Apr. 10, 1961, Ser. No. 101,670
Claims priority, application Austria Apr. 13, 1960
3 Claims. (Cl. 167—39)

This invention relates to fumigant compositions, more particularly those having an insecticidal or fungicidal action, the composition being characterised by the use of a novel agent for promoting the fuming or vaporising of the active insecticide or fungicide when the composition is ignited.

It has long been known that pests in crops, woods or rooms in which direct treatment by dusting or spraying is often difficult, can be successfully combated if the pesticide is converted into a fumigant. In this way, even the finest leaves of trees or the smallest crevices in granaries cannot escape the action of the pesticides.

The fumigant, which usually consists of the active substance, an oxygen-yielding substance such as a chlorate, peroxide or nitrate, and a combustible substance such as sawdust, powdered carbon or starch, usually has the disadvantage that the temperature rises to more than 500° C. during smouldering and hence a relatively high proportion of active substance is decomposed. Moreover, particularly in the case of pest-control in forests, it is often necessary for the active substance to be employed in a large quantity and to act for a long time, and this can be achieved only by using large quantities of fumigant. One of the disadvantages in these prior fumigants was the fact that when the fumigating agent was used in a large quantity it usually burnt away too rapidly.

It has now been found that fumigants comprising hexamethylene tetramine dinitrate and the active substance to be vaporised smoulder only slowly even when used in a relatively large quantity, and when ignited the temperature reached as much lower than that of conventional fumigant. The addition of hexamethylene tetramine dinitrate according to the invention thus provides a fumigant which has a long period of action of the fumes of the active substance resulting in a high degree of utilisation of the active substance used.

It has also been found that by adding ammonium nitrate to the fumigant the amount of hexamethylene tetramine dinitrate required for a given quantity of active substance can be reduced, while at the same time the formation of formaldehyde can be greatly suppressed during the fumigation.

The addition of inert fillers to reduce the reaction temperature, to suppress flaming, and to decelerate the fumigation process, such as was hitherto necessary in fumigants, is not required with the fumigant according to the invention. This has the advantage that it is possible to prepare fumigants having a very high percentage of active substance. Only when the active substance has a low melting point is it advisable to add an inert filler, such as, for example, sawdust, kieselguhr, or tobacco dust, in order to retain the active substance in the vaporisation zone.

The fumigants according to the invention may either be used in a solid block form, for example, briquettes, tablets or bars, or in the form of a loose powder. It has proved particularly advantageous to pack the powder in welded polyethylene bags, which give good protection during storage. During the fumigation process, the polyethylene bag melts and thus allows air to contact the fumigant.

To initiate the fumigation process it is only necessary to ignite the fumigant at one place. The ignition may be started, for example, by a smouldering paper impregnated with $KNO_3$, or by local heating without a flame. If the fumigant is in the form of a powder packed in a polyethylene bag, it may be ignited, for example, by a storm match, with which the polyethylene bag is pierced. After ignition, the fumigant slowly fumes without a flame and yields a dense smoke of active substance.

The hexamethylene tetramine dinitrate used in the fumigant according to the invention can easily be obtained by reacting hexamethylene tetramine in an aqueous solution with concentrated nitric acid. The dinitrate occurs in the form of white crystals.

The following examples illustrate the invention. All parts indicated in the examples are parts by weight.

Example 1

50 parts of hexamethyl tetramine dinitrate and 50 parts of γ-hexachlorocyclo-hexane are ground together into a powder in a Retsch mill. The powder is packed in a polyethylene bag, which is then closed by welding. Ignition is effected by means of a storm match which, after ignition, is pushed through the melting plastic film into the fumigant. The composition burns without the formation of a flame and a dense smoke of γ-hexachlorocyclohexane forms. The temperature during the fumigation process reaches a maximum of 320° C. for a brief period.

Example 2

80 parts of hexamethylene tetramine dinitrate, 80 parts of γ-hexachlorocyclohexane, 30 parts of dry ammonium nitrate and 10 parts of sawdust are jointly ground into a powder. The powder is ignited by touching it with a smouldering $KNO_3$-impregnated paper and for 9 to 11 minutes a dense smoke of γ-hexachlorocyclohexane is evolved. Reaction temperature is 300° to 320° C.

Example 3

38 parts of hexamethylene tetramine dinitrate, 44 parts of hexachlorocyclohexane isomer mixture, 14 parts of ammonium nitrate and 4 parts of sawdust are ground into a powder which is ignited by local heating without the use of a flame. A dense smoke of hexachlorocyclohexane-isomer mixture is evolved.

Example 4

40 parts of hexamethylene tetramine dinitrate, 40 parts of hexachlorobenzene, 15 parts of ammonium nitrate and 5 parts of sawdust are ground into a powder portions of which are ignited in turn in the way described in Examples 1 to 3. In each case a dense smoke of hexachlorobenzene forms, which when deposited prevents the germination of phytopathogenic fungus spores or kills the spores.

Example 5

40 parts of hexamethylene tetramine dinitrate, 40 parts of pentachlorophenol, 15 parts of ammonium nitrate and 5 parts of sawdust are ground into a powder. After ignition, a dense smoke of pentachlorophenol evolves.

Example 6

40 parts of 2,3-dichloronaphthoquinone, 40 parts of hexamethylene tetramine dinitrate, 15 parts by weight of ammonium nitrate and 5 parts by weight of sawdust are ground into a powder. After ignition, it evolves a dense yellowish fungicidal smoke of 2,3-dichloronaphthoquinone.

Example 7

80 parts of 1,1-bis-(p-chlorophenyl)-2,2,2-trichloroethanol are dissolved in 160 parts of acetone. 106.9 parts of kieselguhr and 80.1 parts of hexamethylene tetramine dinitrate are then intimately mixed and the solution containing the active substance is then sprayed into this mixture with constant agitation. After vaporisation of the solvent and subsequent grinding and mixing in a mill a light yellow-brown non-dusting but non-sticking powder is obtained wtih a 30% content of bis-(p-chlorophenyl)-trichloroethanol. The mixture is packed in a polyethylene bag and the latter closed by welding and can be ignited by means of a burning smoulder match, which is pushed through the polyethylene covering. The composition fumes with the evolution of a dense smoke of bis-(p-chlorophenyl)-2,2,2-trichloroethanol, which kills pests on plant parts, such as, for example, *Paratetranychus pilosus* (red spider).

The air-tight packing in polyethylene, which is pierced at one place only when ignited, results in a regulation of the air supply during fumigation and prevents premature distintegration of the fumigant.

*Example 8*

40 parts of flowers of sulphur, 50 parts of hexamethylene tetramine dinitrate, 8 parts of kieselguhr and 2 parts of urea are intimately ground together by grinding in a Retsch mill. After ignition the mixture reacts automatically with the evolution of a dense sulphur smoke which protects plant parts from attack by real mildews, for example *Sphaerotheca pannosa* (rose mildew). The reaction does not give rise to any sulphur dioxide which would have phytotoxic properties.

*Example 9*

40 parts of dithianone (dicyan-dithioanthraquinone), 50 parts of hexamethylene tetramine dinitrate, 8 parts of kieselguhr and 2 parts of urea are intimately mixed in a Retsch mill. After ignition the mixture reacts to form a dense brownish smoke of dithianone, which protects plants from attack by harmful fungi (with the exception of real mildews).

*Example 10*

40 parts of dichloro-diphenyl-trichloroethane, 40 parts of hexamethylene tetramine dinitrate, 15 parts of kieselguhr and 5 parts of urea are intimately mixed in a mill. After ignition the mixture produces a dense aerosol of dichloro-diphenyl-trichloroethane, which kills insect pests.

The fumigants according to the invention may be used particularly for plant protection and pest control. However, the fumigating agents are suitable for promoting the fuming of all substances which vaporise at the temperatures indicated.

The following may be mentioned by way of example of practical applications: insect control at bathing and camping sites, pest-control in greenhouses, fly control in stables and stalls and control of stock pests in store rooms and silos. The fumigants according to the invention can also be successfully used against forest pests, such as pine-leaf wasps or fir shoot lice.

Crops attacked by animal and/or vegetable pests can be covered with a fine dense insecticidal and/or fungicidal coating by means of the fumigants according to the invention. This is particularly advantageous if the leaves or fruit of such plants are difficult to wet, so that aqueous emulsions or suspensions of the active substance have only a slight action. In the control of animal and/or fungoid plant pests with the fumigants of the present invention no undesirable stains are left on the plant parts, and this is advantageous particularly in the cultivation of ornamental plants. Moreover, the dispersion of active substances by the use of fumigants according to the invention does not increase air humidity, such as is inevitable when spraying in glass-houses, so that this avoids an essetial pre-requisite to the incidence of phytopathogenic fungi.

What is claimed is:

1. A fumigant composition comprising hexamethylene tetramine dinitrate as a fumigating agent and a pesticidal agent which is thermally vaporisable at temperatures below 320° C.

2. A method for producing a fumigant composition which comprises grinding hexamethylene tetramine dinitrate with a pesticidal agent which is thermally vaporisable at temperatures below 320° C.

3. A method for preventing attack on plants by pests and fungi which comprises exposing the plants to the action of fumes produced by igniting a fumigant composition comprising hexamethylene tetramine dinitrate and a pesticidal agent which is thermally vaporisable at temperatures below 320° C.

References Cited in the file of this patent
UNITED STATES PATENTS

| | | |
|---|---|---|
| 1,412,065 | Schulz | Apr. 11, 1922 |
| 2,557,814 | Dinsdale et al. | June 19, 1951 |
| 2,590,054 | Taylor et al. | Mar. 18, 1952 |